United States Patent [19]
Yoshinobu et al.

[11] Patent Number: 5,761,372
[45] Date of Patent: Jun. 2, 1998

[54] RECORDING RESERVATION CENTRAL CONTROL SYSTEM FOR ONE OR MORE VTR'S

[75] Inventors: Hitoshi Yoshinobu, Kanagawa; Junya Saito, Saitama; Kazuhiro Akaike, Tokyo, all of Japan

[73] Assignee: Sony Corporation, Tokyo, Japan

[21] Appl. No.: 300,458

[22] Filed: Sep. 2, 1994

[30] Foreign Application Priority Data

Sep. 3, 1993 [JP] Japan ................................. 5-219599

[51] Int. Cl.⁶ ........................... H04N 5/91; H04N 7/08
[52] U.S. Cl. ............................... 386/83; 386/92
[58] Field of Search ........................... 358/335, 342, 358/310, 311; 360/32, 33.1, 13, 69; 348/734, 731, 732, 733; 455/179.1, 181.1, 185.1, 186.1; 386/46, 83, 92; H04N 5/76

[56] References Cited

U.S. PATENT DOCUMENTS

| | | | |
|---|---|---|---|
| 4,879,611 | 11/1989 | Fukui et al. ........................ | 360/69 |
| 4,908,713 | 3/1990 | Levine ............................... | 358/335 |
| 5,187,589 | 2/1993 | Kono et al. ........................ | 358/335 |
| 5,293,357 | 3/1994 | Hallenbeck ........................ | 348/734 |
| 5,307,173 | 4/1994 | Yuen et al. ........................ | 358/335 |
| 5,594,907 | 1/1997 | Tanaka .............................. | 395/750 |

*Primary Examiner*—Robert Chevalier
*Attorney, Agent, or Firm*—Limbach & Limbach L.L.P.

[57] ABSTRACT

A TV system includes at least one VTR and a TV set. The VTR is operated on the basis of a predetermined control signal fed from one TV set connected thereto. The TV set includes: a timer for counting a time; an S-RAM for storing information of a time basis operation of each VTR connected to the TV set; a CPU for generating the predetermined control signal on the basis of the time information from the timer and the information of the time basis operation; and cables for feeding the predetermined control signal to each designated VTR.

7 Claims, 6 Drawing Sheets

RECORDING RESERVATION CENTRAL CONTROL SYSTEM FOR ONE OR MORE VTR'S

BACKGROUND OF THE INVENTION

The present invention relates to a video recording reservation central control system, in a video recording system which is composed of a plurality of VTRs connected to, for example, a single TV set, in which an image reservation or the like for each VTR is centrally controlled whereby it is unnecessary to perform the video recording reservation for each VTR.

Conventionally, a VTR incorporates therein a tuner and a timer for the video recording reservation which means a video recording operation in accordance with the video recording reservation. The tuner and timer are set by manipulating switches provided on a control board of the VTR or a remote commander.

In case of the video recording reservation, a desired channel and time are set by operating switches in accordance with video recording reservation steps that are determined for each VTR.

For instance, recently, in a simple system where a single VTR is connected to a single TV set, there is not serious difficulty to learn the video recording reservation operation. However, a multi-VTR system in which a plurality of VTRs are connected to a single TV set for recording different programs in different VTRs and duplicating the recorded programs between different VTRs has been used.

Figure 6:
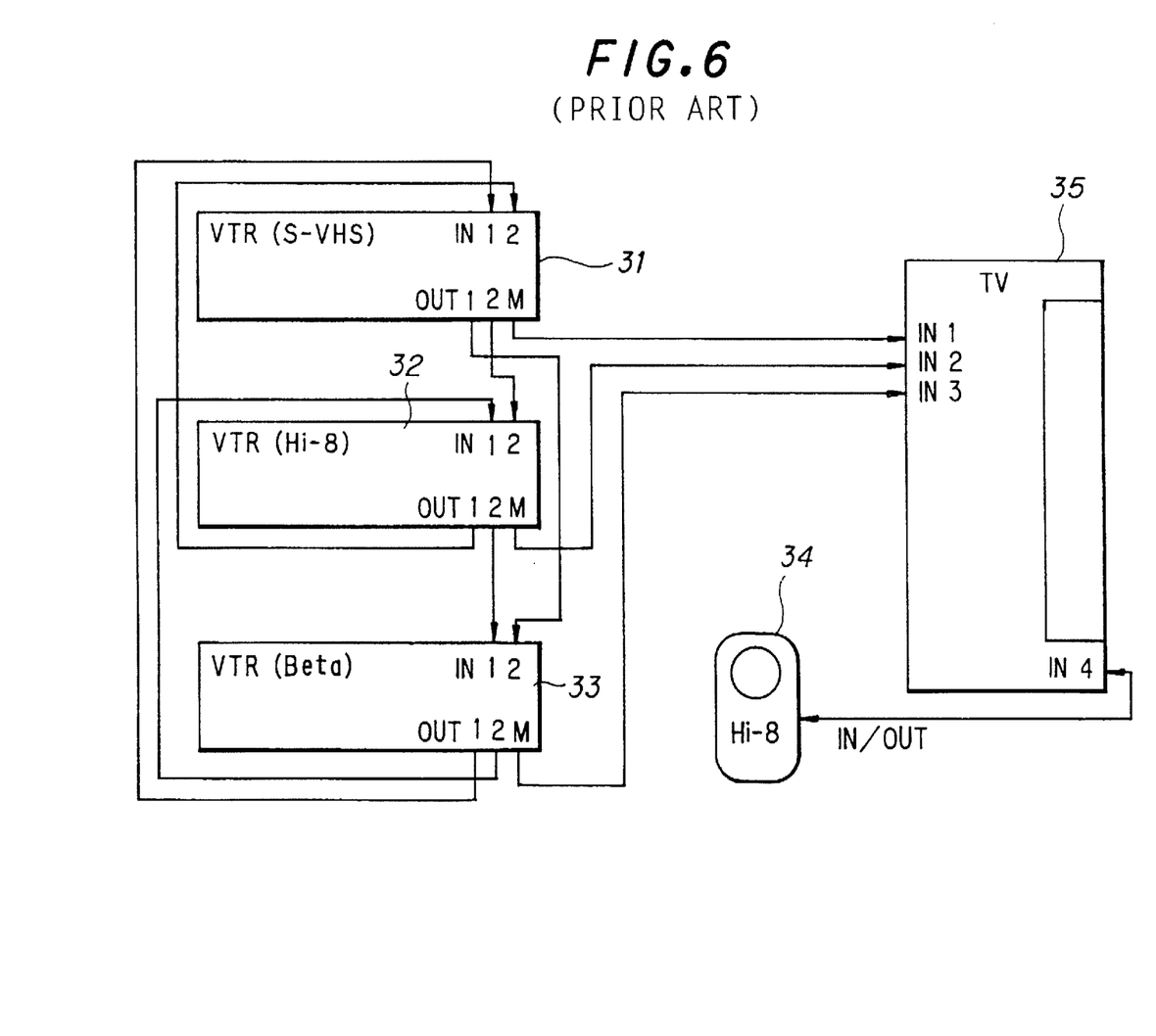
FIG. 6 is an illustration of the prior art.

FIG. 6 shows a video recording/playback system in which three non-portable type VTRs 31 32 and 33 and a single camera having a portable type VTR 34 are connected to a TV set 35. Each of the non-portable type VTRs 31 to 33 has input terminals IN1 and IN2, output terminals OUT1 and OUT2 and a monitor terminal M. The input terminals IN1 and IN2 and output terminals OUT1 and OUT2 of each of non-portable type VTRs 31 to 33 are connected to the output terminals OUT1 and OUT2 and input terminals IN1 and IN2 of the other two of the non-portable type VTRs in a one-to-one relationship, respectively. Incidentally, in FIG. 6, respective cables of an image signal, an audio right signal and an audio left signal are represented by a single solid line. These cables will hereinafter be generally referred to as a video cable.

For example, the input terminal IN1 of VTR 31 is connected to the output terminal OUT1 of VTR 33, the input terminal IN2 of VTR 31 is connected to the output terminal OUT1 of VTR 32, the output terminal OUT1 of VTR 31 is connected to the input terminal IN2 of VTR 33, the output terminal OUT2 of VTR 31 is connected to the input terminal IN2 of VTR 32, the input terminal IN1 of VTR 32 is connected to the output terminal OUT2 of VTR 33, and the output terminal OUT2 of VTR 32 is connected to the input terminal IN1 of VTR 33.

The video cables of the non-portable VTRs 31 to 33 are connected as described above, whereby it is possible to perform a tape duplication or the like between VTRs.

A monitor terminal M of each of the non-portable VTRs 33 to 33 are connected to different input terminals IN1, IN2 and IN3 of a TV set 35 through the video cables.

For instance, the monitor terminal M of VTR 31 is connected to the terminal IN1 of TV 35, the monitor terminal M of VTR 32 is connected to the terminal IN2 of TV 35, and the monitor terminal M of VTR 33 is connected to the terminal IN3 of TV 35.

With such a connection, it is possible to perform the recording from the TV set 35 to each VTR 31 to 33 and the playback from the VTRs 31 to 33 to the TV set 35.

Since the terminal for the camera having a VTR 34 is frequently used, it is connected to a special terminal IN4 which is provided on a front face or a side wall of the TV set 35. This connection is effected by switching the input and output. However, actually, in many cases, the content of the image recorded on the VTR is reproduced on the TV set 35.

By the way, in the above-described conventional system, in case of the video recording reservation of the VTRs, it is necessary to perform the video recording operation for each VTR, and also, in case of the different type VTRs, it is necessary to learn the video recording reservation registration in accordance with the operation steps of the operation interface and the video recording of each VTR. Thus, the system is troublesome to use.

Also, since the timer backup time is different among the respective VTRs, there is a problem that it is difficult to know the insurance time for the video recording reservation setting in case of electric power suspension.

Accordingly, in the video recording/playback system in which the plurality of VTRs are connected to the single TV set, it is necessary to centrally control the video recording reservation of all the VTRs without performing the video recording reservation operation for each VTR.

SUMMARY OF THE INVENTION

In order to solve the above-noted detects, according to the present invention, there is provided a TV system including at least one VTR and a TV set, comprising:

at least one VTR that is operated on the basis of a predetermined control signal fed from the TV set connected thereto; and the TV set including: a timer for counting a time; a storage means for storing information of a time basis operation of each VTR connected to the TV set; a control means for generating the predetermined control signal on the basis of the time information from the timer and the information of the time basis operation; and feeding means for feeding the predetermined control signal to each designated VTR.

According to another aspect of the invention, there is provided a TV set connectable to at least one VTR, comprising:

a timer for counting a time;

a storage means for storing information of a time basis operation of each VTR connected to the TV set;

a control means for generating the predetermined control signal on the basis of the time information from the timer and the information of the time basis operation; and feeding means for feeding the predetermined control signal to each designated VTR.

The recording reservation central control system for at least one VTR according to the present invention may offer the following advantages.

(1) A plurality of VTRs are connected to a TV set installing therein a timer, a time basis operation is effected on the basis of the timer whereby not only it is unnecessary to set the time of the timer for each VTR connected to the TV set but also it is possible to centrally control the operations by the timer of the TV set even if a plurality of different VTRs are connected to the TV set. Also, it is possible to dispense with a separate timer for each a VTR and hence it is possible to reduce a cost for the VTR.

Furthermore, since the timer is concentrated on the TV set side, there is no fear that the respective VTRs would be different in backup time for the timer in case of electric power suspension or the like, and then, the backup time period may be insured. It is possible to realize the enhancement of the performance of the timer of the overall system.

(2) The time basis operation is quite excellent as follows. Due to the recording reservation and turning on/off of the power sources, even if a plurality of different type of VTRs are connected to the TV set, It is possible to operate the recording reservation and the power source on/off by a unified manipulation.

(3) The system is provided with a memory for storing in order the recording reservations of the respective VTRs in accordance with the order of the recording start times while supervising the content of the memory and the content indicated by the timer for recording operation of each VTR connected to the TV set. Accordingly, even if the different type VTRs are connected to the TV set, it is possible to perform the recording operation in the respective VTRs in the unified circumstances.

(4) When the recording reservation times of the plurality of VTRs are overlapped with each other, the recording is carried out in a time sharing manner, so that even if the recording reservations of the plurality of VTRs are overlapped in the same time period, it is possible to record the video signals or the like at the same time.

(5) On the CRT display in the TV set in the time basis operation, the system is provided with the operation interface based upon the unified operational order, so that it is possible to readily perform the operation of the recording reservation of the VTRs in a unified manner.

(6) The operation interface considerably enhances the operationability by utilizing a remote controller system such as a remote controller mouse.

DESCRIPTION OF THE PREFERRED EMBODIMENTS

A video recording reservation central control system for one or more VTRs in accordance with an embodiment of the invention will now be described with reference to the accompanying drawings.

Figure 1:
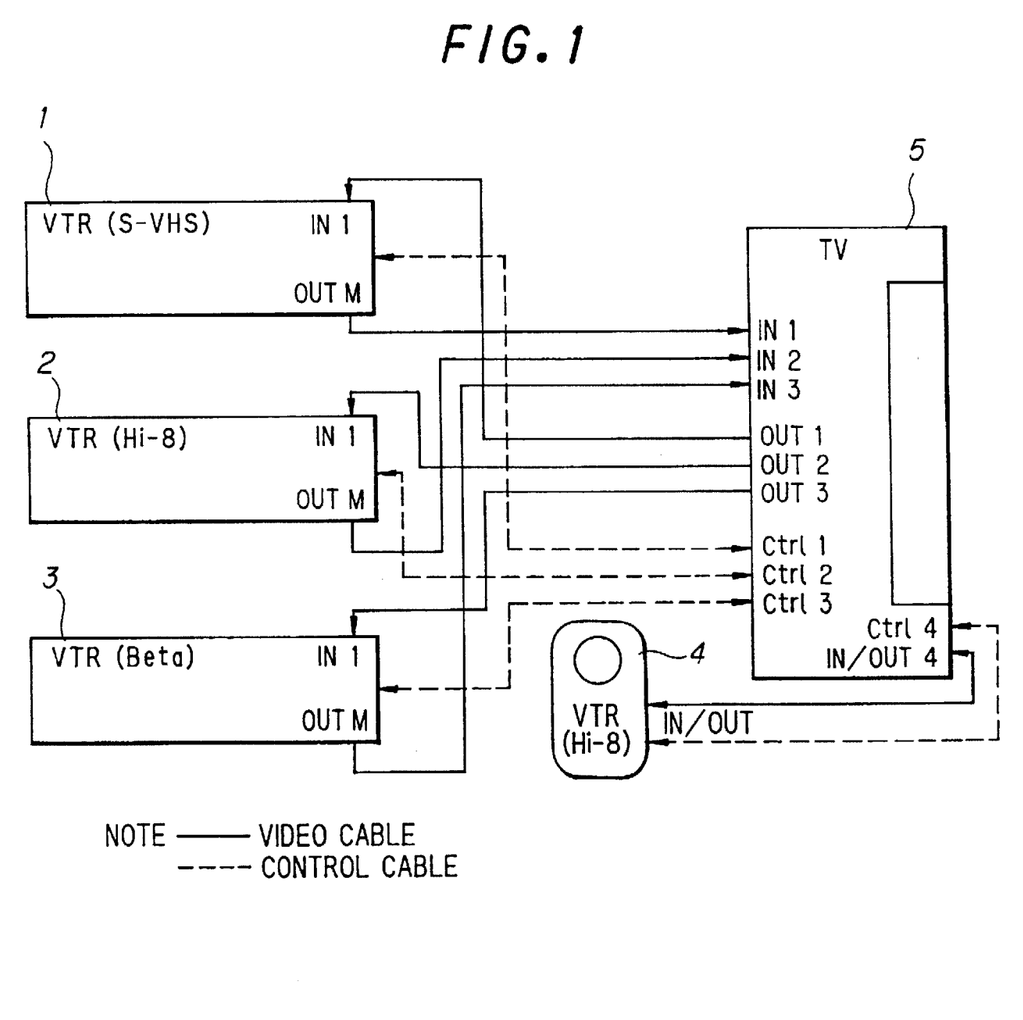
FIG. 1 is a block diagram showing a recording reservation central control system for one or more VTRs in accordance with an embodiment of the invention.

In the embodiment, as shown in FIG. 1 three non-portable type VTRS, i.e., S-VHS type VTR 1, Hi-8 type VTR 2 and Beta type VTR 3 and a camera installing type portable VTR 4 are connected to a single TV set 5.

Incidentally, a solid line represents a video cable for transmitting video and audio signals, and a dotted line represents a control cable for transmitting control signals.

It is a feature of this system that respective VTRS 1 to 4 are all connected to the TV set 5 only and a time designation operation is carried out for each VTR, unlike the conventional system in which VTRs 1 to 4 are connected to each other.

Each of the VTRs 1 to 4 has a command interpreter for interpreting a command fed through the control cable from the TV set 5 and is so constructed as to perform various kinds of time designation operations such as a recording start, a recording stop, a power source turn-on/off in accordance with the output of the command interpreter.

The TV set 5 is so constructed to feed coded commands through the control cables on the basis of the specification of each VTR to thereby centrally control all the VTRs 1 to 4.

Figure 2:
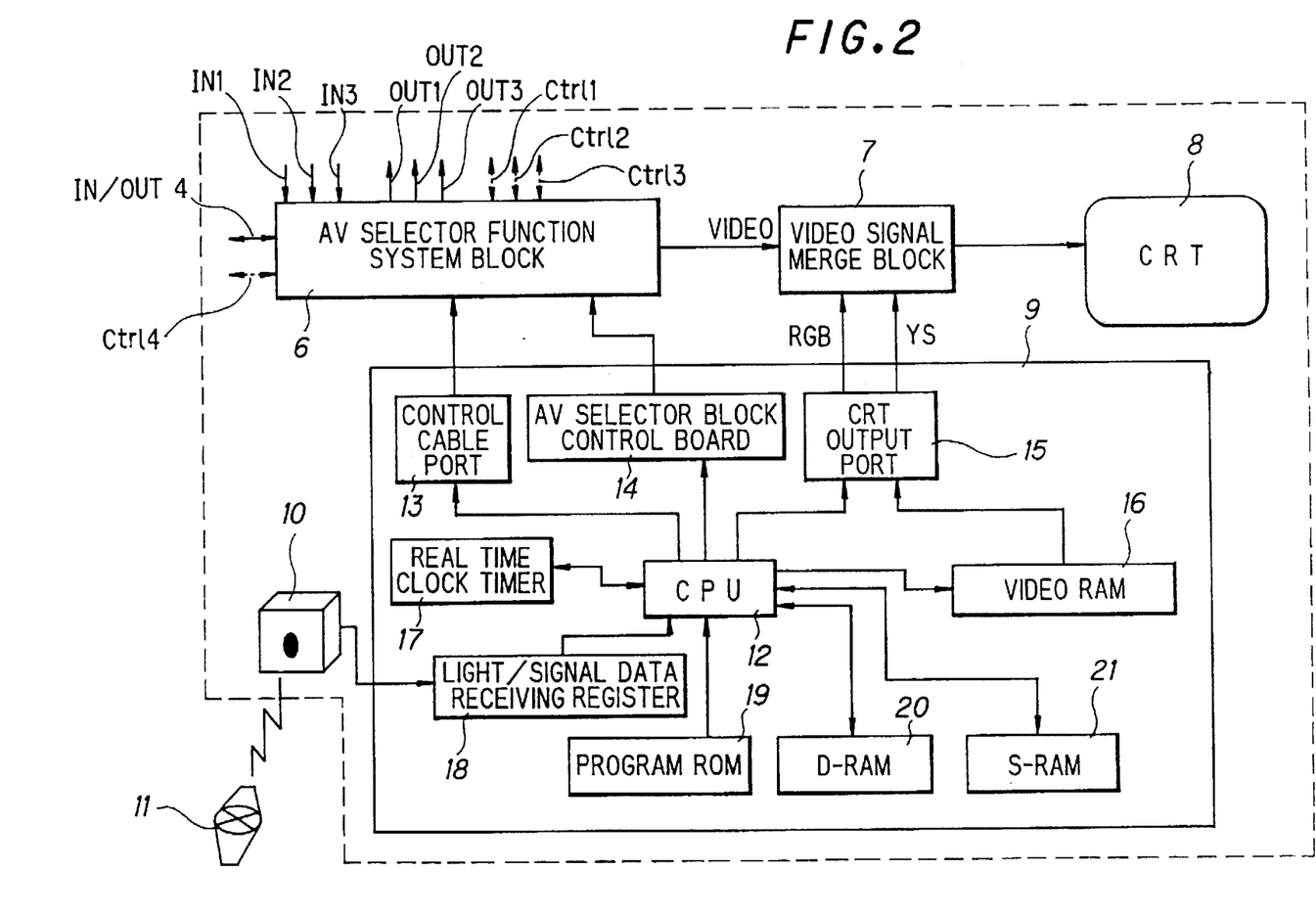
FIG. 2 is a block diagram showing a structure on the side of a TV set shown in FIG. 1.

The TV set 5 having such functions is composed, as shown in FIG. 2, of an AV selector function system block 6, a video signal merge block 7, a CRT 8, a controller 9, a remote controller light receiving section 10, and a mouse remote controller 11.

The AV selector function system block 6 is connected to the VTRs 1 to 4 and executes the AV selector function (selection of audio and video signals) under the control of the controller 9 to feed a video signal to the CRT 8.

The video signal merge block 7 mixes a video signal from the AV selector function system block 6 with a video signal (RGB signal, YS signal and the like) for displaying an operating interface for the video recording reservation to be fed from the controller 9 and feeds the mixed signal to the CRT 8.

This operating interface is displayed so that operational windows corresponding to the VTRs 1 to 4, respectively, are superimposed over the image field of the CRT 8 and operation function buttons for controlling the VTRs 1 to 4 are displayed in the windows in order that the user may readily make video recording reservations of the VTRs 1 to 4.

The CRT 8 displays a single field image including a regular video image and the operational interface formed by the video signal merge block 7.

The controller 9 is comprised of a CPU 12, a control cable port 13, an AV selector block control port 14, a CRT output port 15, a video RAM 16, a real time clock timer 17 (hereinafter referred to as a timer), a light receiving/signal receiving data register 18, a program ROM 19, a D-RAM 20, and an S-RAM 21.

These circuits 12 to 21 have the following functions.

The CPU 12 is connected to all the circuits 13 to 21. The CPU 12 reads out and executes the programs, to be described later, for the video recording reservation and the auto power off (on/off operation of the power source) stored in the program ROM 19 to thereby control the operation of the overall system.

The control cable port 13 is connected to the control cable for feeding commands outputted from the CPU 12 to the respective VTRs 1 to 4 through the control cables.

The AV selector block control port 14 controls the AV select operation of the AV selector function system block 6 under the control of the CPU 12.

The CRT output port 15 is connected to the video RAM 16 for feeding data of video signals (RGB signals and YS signals) for the operation interface formed within the video RAM 16 to the video signal merge block 7 under the control of the CPU 12.

The video RAM 16 stores the operation interface data corresponding to one image field. Incidentally, the video signal data to the operation interface are formed by inserting the design data of the window read out from the program ROM 19 into a position allotted to the VTR located at a certain position displayed on the CRT.

The timer 17 counts the real time and at the same time generates an interrupt signal for the CPU 12 corresponding to the registered reservation information.

The light receiving/signal data receiving register 18 temporarily stores the remote control data received in a remote controller light/signal receiving section 10 and feeds the data to CPU 12.

The program ROM 19 stores the various programs and various data for video recording reservation and feeds them to the CPU 12. The D-RAM 20 is a dynamic RAM for temporarily storing the various data.

The S-RAM 21 stores the video recording reservation time of each of the VTRs 1 to 4 inputted from the mouse remote controller 11.

Figure 3:
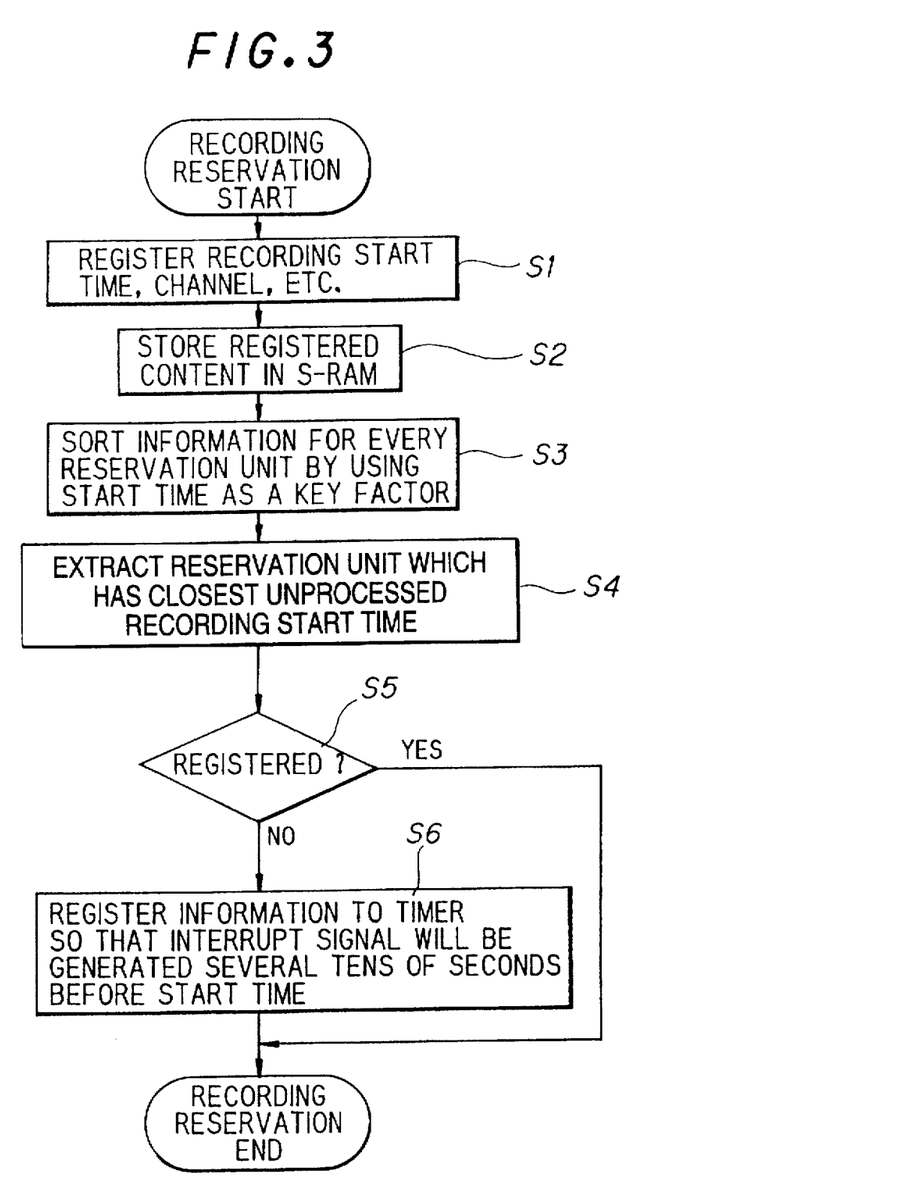
FIG. 3 is a flowchart showing a recording reservation operation in accordance with the embodiment of the invention.
Figure 4A:
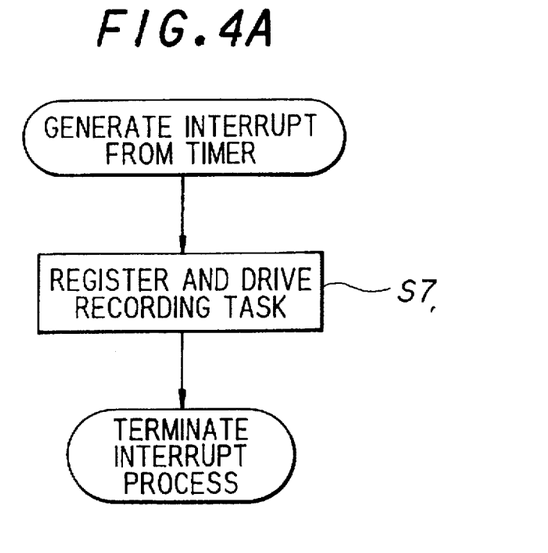
FIGS. 4A and 4B are flowcharts showing a timer interrupt operation in one and another embodiment of the invention, respectively.

The operation of the embodiment will be explained with reference to flowcharts shown in FIGS. 3 to 5.

1. Video Recording Reservation (see FIG. 3)

(1) The operation interface of the VTR in which the video recording is desired to be reserved is displayed on the image field of CRT 8 by using the mouse remote controller 11, and start date and time and stop date and time, channels, speed (LP/SP or Standard/Double Speed) and the like of programs to be recorded are registered. The registered information is to be processed as one unit of the video recording (S1).

(2) The registered reservation unit information is stored in the S-RAM 21 through the CPU 12 (S2).

(3) Subsequently, the CPU reads out the reserved unit information stored in the S-RAM 21 and sorts the information for every reservation unit by using the start time as a key factor (S3).

(4) Subsequently, the CPU 12 extracts the reservation unit which has the closest recording start time relative to the current time displayed by the timer 17. However, in this case, the reservation unit which is now under the recording preparation is excluded (S4).

(5) Furthermore, the CPU 12 judges whether or not the extracted reservation unit has been already registered in the timer 17 (S5). If so, the process is stopped (6) In the case where the extracted reservation unit is not registered in the timer 17, this unit is registered in the timer 17 by the CPU 12. Namely, the CPU 12 registers the reservation unit so that an interrupt signal will be generated at the time, i.e., M seconds (for instance, several tens of seconds) before the recording start in the timer 17 (S6). Thus, the recording reservation has been completed.

2. Generation of Interrupt Signal from Timer 17 (see FIG. 4A)

The CPU 12 returns back to the normal routine when the above describe recording reservation has been completed. When the interrupt signal is generated from the timer 17, the CPU 12 reads out the recording task program stored in the program ROM 19 and drives and executes the retrieved recording task (S7).

In such a process, it is possible to turn off the power source for the video merge block 7, the CRT 8 and the like, but the CPU 12 has to be always operated for the stand-by condition.

However, for instance, it is possible to change the system so that the above-described interrupt signal of the timer 17 is also supplied to the power source control circuit (not shown). The CPU 12 is automatically operated (auto-wake-up) on the basis of the interrupt signal and thereafter the recording task is driven.

Figure 4B:
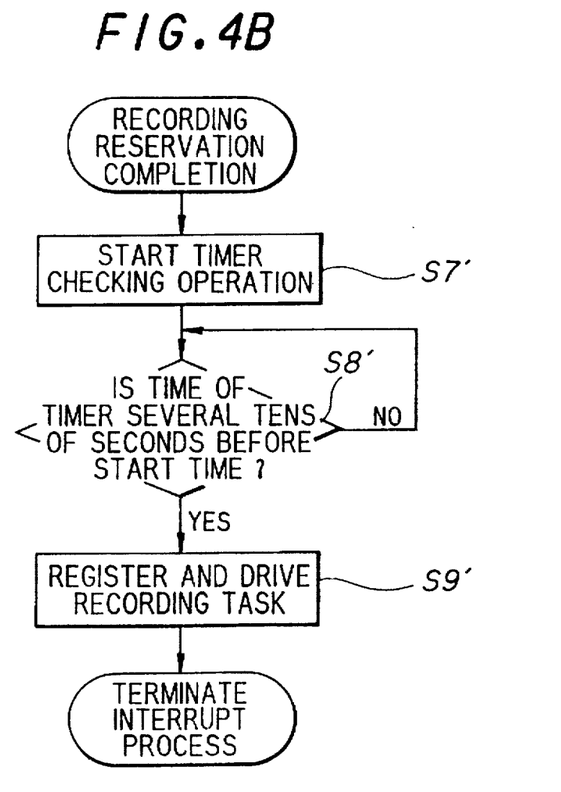
Figure 5:
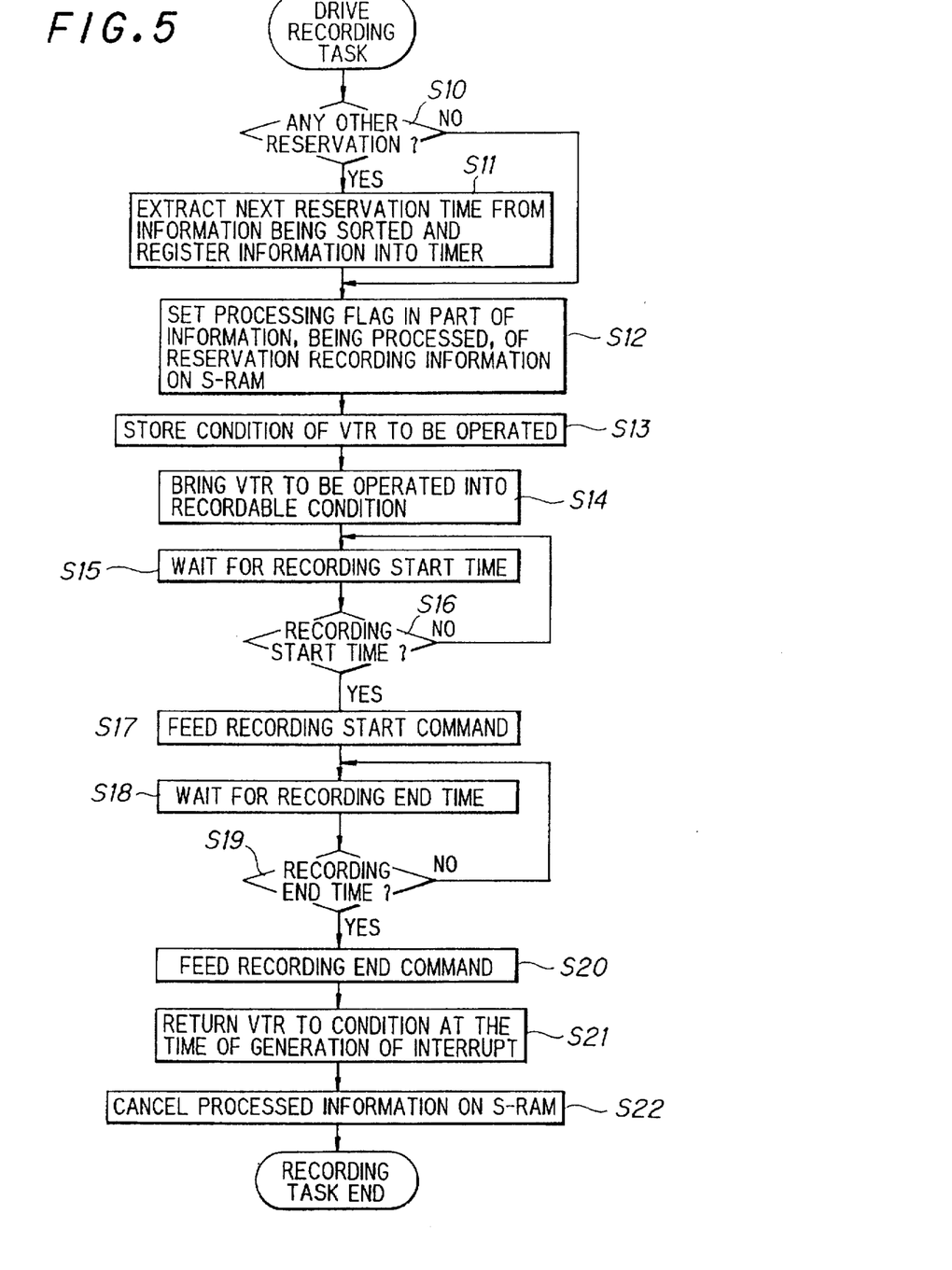
FIG. 5 is a flowchart showing a recording task in the embodiment of the invention.

Also, in the foregoing example, the drive operation of the recording task is performed on the basis of the interrupt signal from the timer 17 but it is possible to drive the recording task by any other methods (see FIG. 4B).

For instance, in advance, a condition supervision program is stored in the program ROM 19, and simultaneously with the completion of the recording reservation, the CPU 12 starts a timer checking operation on the basis of the condition supervision program (S7'). The timer 17 counts the real time and feeds this time information to the CPU 12. The CPU 12 periodically compares the time information fed from the timer 17 with the reserved recording start time stored in the S-RAM 21 (S8'), and drives the recording task M seconds (for example, several tens of seconds) before the reservation time (S9').

3. Recording Task (see FIG. 5)

When the recording task is driven, the following reservation recording step are carried out.

(1) The CPU 12 judges whether or not any other reservation units are present in the S-RAM 21 (S10). Subsequently, in the case where the other reservation units are present, the reservation unit having the closest recording start time is selected and is registered in the timer 17 (S11).

(2) Subsequently, the CPU 12 imparts a flag of "under processing" to the reservation unit information of the VTR which is under recording operation in the S-RAM 21 (S12).

(3) Subsequently, the CPU 12 sends a condition notice command through the control cable to the VTR to be operated for recording. The VTR to be operated for recording transfers the current condition, for example, a power-off condition through the control cable to the TV set 5 in response to the transferred condition notice command. The transferred current condition of the VTR to be operated for recording is stored in the S-RAM 21 by the CPU 12 for restoring the current condition after the completion of the recording (S13). Subsequently, the CPU 12 feeds a recording preparation command to the VTR to be operated for recording and instructs a recording preparation operation to the VTR (S14). The VTR to be operated for recording is kept under a recordable condition after the preparation operation such as a tape loading operation or the like which needs a certain period of time. The CPU 12 starts the timer checking operation and waits for the time indicated by the timer 17 to be the recording start time (S15).

(4) When the time indicated by the timer 17 is the recording start time stored in the S-RAM 21, the CPU 12 feeds the recording operation start command through the control cable to the VTR to be operated for recording (S16 and S17). In accordance with this command the VTR which has been kept under the preparation condition starts the recording operation.

(5) Subsequently, the CPU 12 waits for the recording completion time (S18). When the time indicated by the timer 17 is the recording completion time stored in the S-RAM, the CPU 12 feeds through the control cable the recording operation completion command and the information representative of the condition of the VTR before the recording operation to the VTR which is kept under the recording operation (S19 and S20). Thus, the VTR finishes the recording operation and returns back to the condition before the recording start time (S21). For example, if the power source was turned off before the recording operation, the power source would be turned off.

(6) Also, the reservation information which is provided with the flag within the S-RAM 21 is to be canceled. Thus, the reservation recording operation has been completed (S22).

In accordance with the order of the steps (1) to (6), the reservation recording may be carried out. However, even if the reservation recording times are overlapped for a plurality of VTRs, if a time sharing processing is well effected, it is possible to perform reservation recording.

Incidentally, in the foregoing example, the CPU 12 obtains the current condition of the VTR to be operated for recording from the control cable. It is possible to obtain the current condition from the input condition of the video cable from the VTR to be operated for recording when the current notice command is sent therefrom.

4. Operation of Sleep Timer (Auto Power Off)

(1) A "sleep time," which is a time for turning off the power source, is registered by using the operation interface on the image field of the CRT 8.

(2) The registered sleep time is stored in the S-RAM 21 and at the same time, the CPU 12 starts a timer checking function in accordance with the condition supervision program.

(3) When the time indicated by the timer 17 reaches the sleep time, the CPU 12 feeds a power source-off command through the control cables to all the VTRs connected to the TV set. The power sources of all the VTRs are turned off by the power source-off command.

(4) Then, the CPU 12 feeds the power source-off command to all the VTRs and confirms on the basis of the responses thereto that all the power sources of the VTRs are turned off. Thereafter, the CPU 12 turns the power source of the TV set off. Thus, the auto power off operation for the overall system is completed.

In another embodiment of the invention where the recording central control system is used for at least one VTR, it is possible to record a radio program by connecting an audio equipment instead of the VTR or to listen to the music by starting a CD player at a desired time.

Also, by applying the power source on/off control system to various domestic instruments, it is possible to start/stop them at a desired time in a central control manner.

As has been described above, the recording reservation central control system for at least one VTR according to the present invention may offer the following advantages.

(1) A plurality of VTRs are connected to a TV set having therein a timer, a time basis operation is effected on the basis of the timer whereby the video reservation and the turn-on/off operation of the power sources of all the VTRs connected to the TV set may be centrally controlled only by the timer on the TV set side. Accordingly, not only it is unnecessary to set the time of the timer for each VTR connected to the TV set but also it is possible to perform the operation of the video recording reservation for each VTR connected to the TV set, the learning operation for the time setting operation for each VTR and the recording reservation operation in accordance with the TV side specification. Thus, it is unnecessary to learn the video recording reservation operation for the respective VTR.

Also, it is possible to dispense with a timer for a VTR and hence it is possible to reduce the cost for the VTR. It is possible to obtain the high performance of the time control for the overall system by enhancing the performance of the timer on the TV set side. This is a quite excellent feature.

Furthermore, since the timer is concentrated on the TV set side, there is no fear that the respective VTRs would be different in backup time for the timer in case of electric power suspension or the like, and then, the backup time period may be insured.

In the system according to the invention, even for a VTR having no tuner or timer such as a camera having a portable VTR or the like, it is possible to perform the reservation recording as in the non-portable type VTR.

(2) The time basis operation is quite excellent as follows. Due to the recording reservation and turning on/off of the power sources, even if a plurality of different type VTRs are connected to the TV set, it is possible to operate the recording reservation and the power source on/off by a unified manipulation, and it is unnecessary to learn the time setting operation of the respective VTRs or to learn the video recording reservation manipulation of the respective VTRs connected to the TV set.

(3) The time basis operation is also quite excellent in the following point. The system is provided with a memory for storing in order the recording reservations of the respective VTRs in accordance with the order of the recording start times while supervising the content of the memory and the content indicated by the timer for recording operation of each VTR connected to the TV set. Accordingly, even if the different type VTRs are connected to the TV set, it is possible to perform the recording operation in the respective VTRs in the unified circumstances, and it is unnecessary to learn the operation of time setting for the respective VTRs and the setting the timers of the respective VTRs.

(4) When the recording reservation times of the plurality of VTRs are overlapped with each other, the recording is carried out in the time sharing manner, so that even if the recording reservations of the plurality of VTRs are overlapped in the same time period, it is possible to record the video signals or the like at the same time. Only with the single timer on the TV set side, it is possible to perform the plurality of video records and turn-on/off of the power sources.

(5) On the CRT display in the TV set in the time basis operation, the system is provided with the operation interface based upon the unified operational order, so that it is possible to readily perform the operation of the recording reservation of the VTRs in a unified manner. Even if the different type VTRs are connected, it is unnecessary to learn the operational steps for each VTR.

(6) The operation interface considerably enhances the operationability by utilizing a remote controller system such as a remote controller mouse.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A TV system including a plurality of VTRs and a TV set wherein:

each of the plurality of VTRs is operated on the basis of a separate predetermined control signal fed from the TV set connected thereto; and said TV set includes a timer for counting a time; a storage means for storing information of a time basis operation of each VTR connected to said TV set; a control means for generating said predetermined control signal on the basis of the time information from said timer and said information of said time basis operation; and feeding means for feeding said predetermined control signal to each designated VTR to thereby individually control each designated VTR;

wherein said control means operates in a time sharing manner if a plurality of pieces of stored information of said time basis operation are overlapped with each other on a time basis and the control means generates separate predetermined control signals for different VTRs based on the plurality of pieces of stored information which are overlapped with each other on a time basis and supplies the different predetermined control signals to different ones of the plurality of VTRs via the feeding means to separately record different programs.

2. A TV system including at least one VTR and a TV set comprising:

at least one VTR that is operated on the basis of a predetermined control signal fed from the TV set connected thereto;

said TV set including: a timer for counting a time; a storage means for storing information of a time basis operation of each VTR connected to said TV set; a control means for generating said predetermined control signal on the basis of the time information from said timer and said information of said time basis operation; and feeding means for feeding said predetermined control signal to each designated VTR;

wherein said time basis operation comprises at least one of a reservation recording operation and a power source on/off operation of the VTR to be operated; and wherein said control means stores a condition of the VTR to be operated, prior to the reservation recording, and generates a control signal at the time of completion of the reservation recording for returning the VTR to be operated back to the condition before the reservation recording.

3. A TV set connectable to a plurality of VTRs, comprising:

a timer for counting a time;

a storage means for storing information of a time basis operation of each VTR connected to said TV set;

a control means for generating a predetermined control signal on the basis of the time information from said timer and said information of said time basis operation; and feeding means for feeding said predetermined control signal to a designated VTR to thereby control the designated VTR;

wherein said control means operates in a time sharing manner if a plurality of pieces of stored information of said time basis operation are overlapped with each other on a time basis and the control means generates separate predetermined control signals for different VTRs based on the plurality of pieces of stored information which are overlapped with each other on a time basis and supplies the different predetermined control signals to different ones of the plurality of VTRs via the feeding means to separately record different programs.

4. A TV set connectable to at least one VTR comprising:

a timer for counting a time;

a storage means for storing information of a time basis operation of each VTR connected to said TV set;

a control means for generating a predetermined control signal on the basis of the time information from said timer and said information of said time basis operation;

feeding means for feeding said predetermined control signal to each designated VTR;

wherein said time basis operation comprises at least one of a reservation recording operation and a power source on/off operation of the VTR to be operated; and wherein said control means stores a condition of the VTR to be operated, prior to the reservation recording, and generates a control signal at the time of completion of the reservation recording for returning the VTR to be operated back to the condition before the reservation recording.

5. A TV system including a plurality of VTRs and a TV set wherein:

each of the plurality of VTRs is operated on the basis of a separate predetermined control signal fed from the TV set connected thereto;

said TV set includes a timer for counting a time; a storage means for storing information of a time basis operation of each VTR connected to said TV set; a control means for generating said predetermined control signal on the basis of the time information from said timer and said information of said time basis operation; and feeding means for feeding said predetermined control signal to each designated VTR to thereby individually control each designated VTR; and wherein said control means stores a condition of the VTR to be operated, prior to the reservation recording, and generates a control signal at the time of completion of the reservation recording for returning the VTR to be operated back to the condition before the reservation recording.

6. The TV system according to claim 5, wherein said control means operates in a time sharing manner if a plurality of pieces of stored information of said time basis operation are overlapped with each other on a time basis and the control means generates separate predetermined control signals for different VTRs based on the plurality of pieces of stored information which are overlapped with each other on a time basis and supplies the different predetermined control signals to different ones of the plurality of VTRs via the feeding means to separately record different programs.

7. The TV system according to claim 5, wherein said timer generates a predetermined interrupt signal to the control means M seconds before an operation start time of the reservation recording thereby causing the control means to generate said predetermined control signal.

* * * * *